United States Patent
Moell et al.

(10) Patent No.: US 10,770,885 B2
(45) Date of Patent: Sep. 8, 2020

(54) GROUND FAULT CIRCUIT INTERRUPTER WITH COMBINED TRIPPING CURVE FOR ELECTRIC VEHICLE CHARGING

(71) Applicant: Bender GmbH & Co. KG, Gruenberg (DE)

(72) Inventors: Winfried Moell, Laubach (DE); Michael Kammer, Hungen (DE); Florian Habel, Gruenberg (DE); Matthias Jost, Lich (DE)

(73) Assignee: BENDER GMBH & CO. KG, Gruenberg (DE)

(*) Notice: Subject to any disclaimer, the term of this patent is extended or adjusted under 35 U.S.C. 154(b) by 245 days.

(21) Appl. No.: 15/693,943

(22) Filed: Sep. 1, 2017

(65) Prior Publication Data

US 2018/0069390 A1 Mar. 8, 2018

Related U.S. Application Data

(60) Provisional application No. 62/382,840, filed on Sep. 2, 2016.

(51) Int. Cl.
*H02H 3/16* (2006.01)
*H02H 3/00* (2006.01)

(52) U.S. Cl.
CPC .............. *H02H 3/16* (2013.01); *H02H 3/006* (2013.01)

(58) Field of Classification Search
CPC .................................. H02H 3/16; H02H 3/006
See application file for complete search history.

(56) References Cited

U.S. PATENT DOCUMENTS

| | | | |
|---|---|---|---|
| 5,296,996 A * | 3/1994 | Hansson | H01C 7/02 361/106 |
| 6,882,511 B1 * | 4/2005 | Patruno | H02H 3/093 361/42 |
| 2014/0015487 A1 * | 1/2014 | Brown | B60L 3/0069 320/109 |

OTHER PUBLICATIONS

Rockwell, "Bulletin 1489 UL489 Circuit Breakers Tech Data", 1489-TD001 E-EN-P, Jun. 2011 (Year: 2011).*

* cited by examiner

*Primary Examiner* — Scott Bauer
(74) *Attorney, Agent, or Firm* — King & Schickli, PLLC

(57) ABSTRACT

A ground fault circuit interrupter with a residual current device is suggested which comprises a tripping characteristic having a combined time-current curve that implements a minimum tripping time value of a first time-current curve and a second time-current curve for each current value.

2 Claims, 3 Drawing Sheets

State of Art

State of Art

GROUND FAULT CIRCUIT INTERRUPTER WITH COMBINED TRIPPING CURVE FOR ELECTRIC VEHICLE CHARGING

CROSS-REFERENCE TO RELATED APPLICATIONS

The present application claims the benefit of U.S. Provisional Application No. 62/382,840, the disclosure of which is incorporated herein by reference.

FIELD OF THE INVENTION

The disclosure relates to a ground fault circuit interrupter (GFCI), in particular to a ground fault circuit interrupter based on a residual current device for detecting residual currents in electric vehicle (EV) supply circuits.

BACKGROUND

A ground fault circuit interrupter (GFCI), also called residual current device (RCD), is a device that shuts off an electric power circuit when it detects that a leakage (residual) current is flowing along an unintended path. The use of some protective devices is specifically required in the National Electrical Code (NEC), which defines a ground fault circuit interrupter as "a device intended for the protection of personnel that functions to de-energize a circuit or portion thereof within an established period of time when a current to ground exceeds the values established for a Class A device." A Class A GFCI trips when the current to ground has a value in the range of 4 milliamps to 6 milliamps.

Tripping characteristics of ground fault circuit interrupters can be described by a tripping curve plotting the amount of time required for the device to interrupt the electric circuit in dependency of a detected residual current level.

More specifically, on the one hand in standard UL 2231-2 "Personnel protection systems for electric vehicle (EV) supply circuits—Particular requirements for protection devices for use in charging systems for electric vehicle charging" UL as a standards developer in the US defines a tripping characteristic the protection devices need to be compliant with.

On the other the International Electrotechnical Commission (IEC) as a further international standards organization has prepared the standard IEC 62752:2016 "In-cable control and protection devices (IC-CPDs) for mode 2 charging of electric road vehicles". This standard applies to portable devices performing simultaneously the functions of detection of the residual current, of comparison of the value of this current with the residual operating value and of opening of the protected circuit when the residual current exceeds this value.

Both standards are suggesting tripping characteristics for protection devices (GFCIs and RCDs) which are different from each other.

Consequently, the manufacturer of such protection devices are producing two different products each having its own tripping curve implemented: one product according to the UL standard and the other according to IEC standard.

SUMMARY OF THE INVENTION

Therefore, it is an objective of the present invention to economize the manufacturing of ground fault circuit interrupters.

This objective is achieved by a ground fault circuit interrupter with a residual current device which comprises a tripping characteristic having a combined time-current curve (tripping curve) that implements a minimum tripping time value of a first time-current curve and a second time-current curve for each current value.

Starting from two given tripping curves the basic idea is to implement a resulting tripping curve which represents the minimum trip time of both underlying tripping curves for each given current value.

Two different tripping curves are combined resulting in a new tripping curve which is compliant to the characteristic required by each of the given tripping curves.

In a further aspect of an embodiment of the present invention the first time-current curve is a time-current curve according to the standard UL 2231-2 and the second time-current curve is a time-current curve according to the standard IEC 62752-1.

This embodiment covers both standards, the UL 2231-2 standard and the IEC 62752-1 standard.

DETAILED DESCRIPTION

Figure 1:
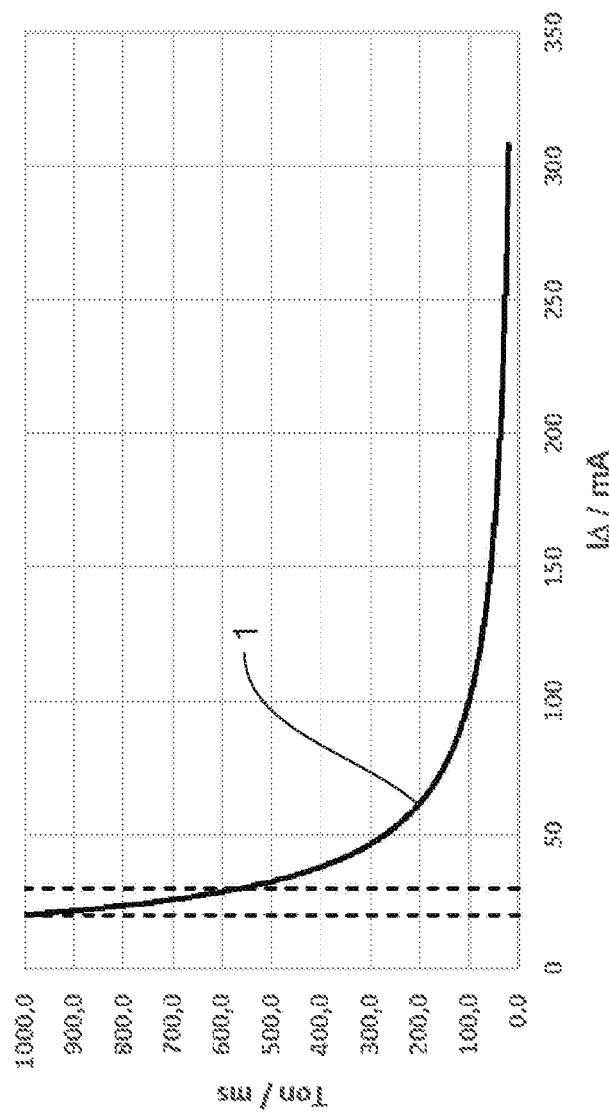
FIG. 1 shows the tripping curve according to the UL 2231-2 standard.
Figure 2:
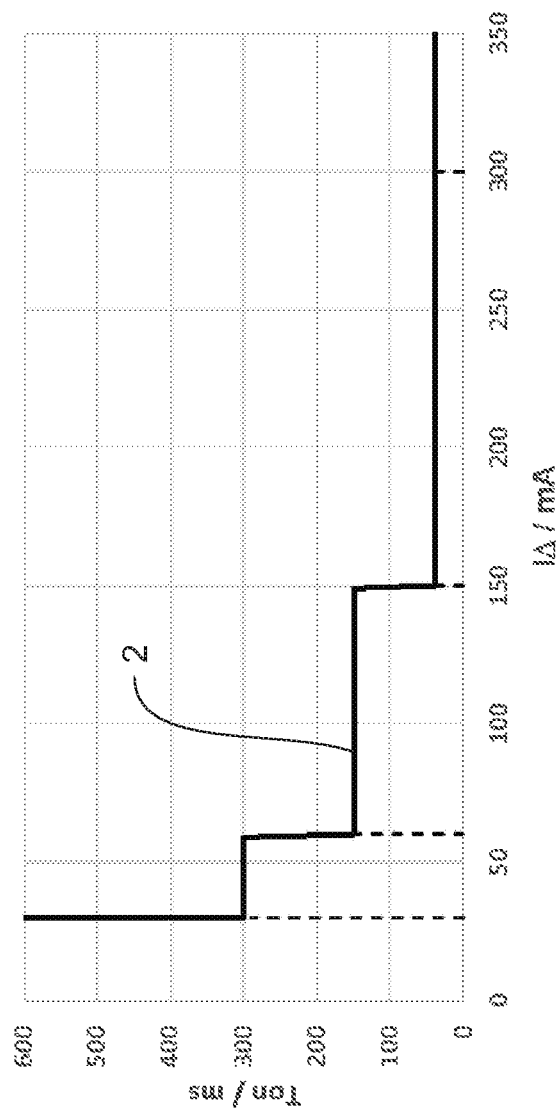
FIG. 2 shows the tripping curve according to the IEC 62752-1 standard.

As can be seen from FIGS. 1 and 2 the tripping characteristics defined by the UL 2231-2 standard—tripping curve 1—and the IEC 62752-1 standard—tripping curve 2—do not match. In general, the trip time Ton (vertical axis) decreases with an increasing residual current IΔ (horizontal axis) but there are sections where the trip time Ton associated with the UL 2231-2 standard are above the corresponding time values Ton of the IEC 62752-1 standard and vice versa.

Figure 3:
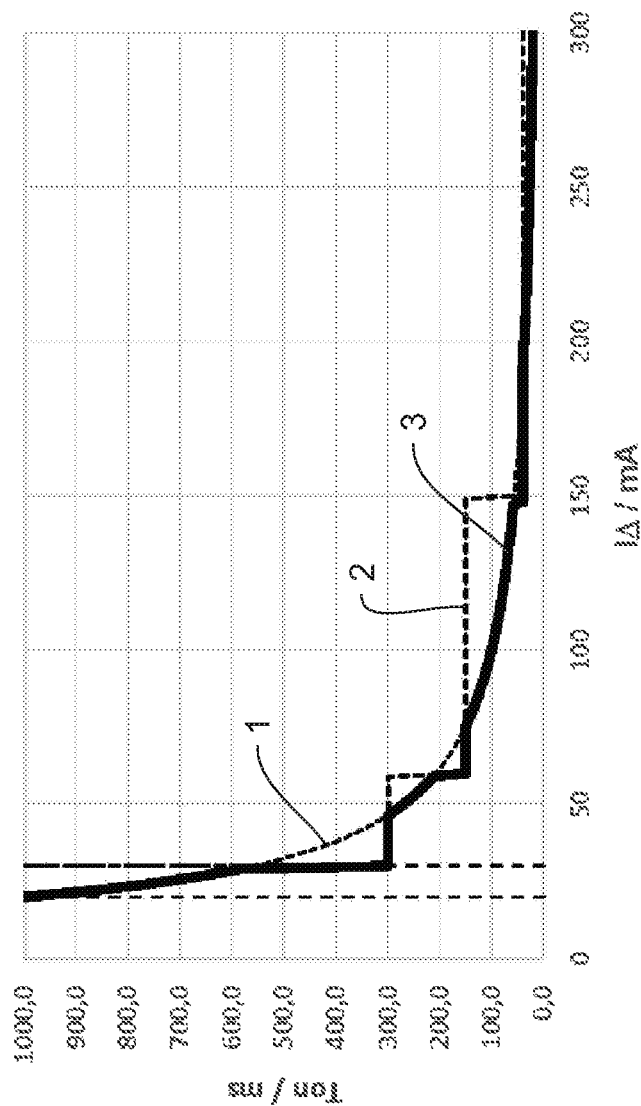
FIG. 3 shows the resulting tripping curve according to the invention.

The resulting tripping curve 3 illustrated in FIG. 3 implements the minimum time value of both tripping curves 1, 2 for a given residual current IΔ according to the invention. The tripping characteristic represented by the resulting tripping curve 3 is therefore compliant to UL 2231-2 standard as well as to IEC 62752-1 standard, which standards are incorporated herein by reference.

Moreover there is no additional delay time defined by the resulting tripping curve, meaning that the implemented combined curve utilizes the maximum permissible tripping time (according to the respective standard) in order to avoid false tripping.

What is claimed is:

1. Ground fault circuit interrupter (GFCI) with a residual current device comprising a tripping characteristic having a combined time-current curve that implements for each current value a minimum tripping time value of a first time-current curve and a second time-5 current curve.

2. The ground fault circuit interrupter according to claim 1, wherein the first time-current curve is a time-current curve according to the standard UL 2231-2 and the second time-current curve is a time-current curve according to the standard IEC 62752-1.

* * * * *